(12) United States Patent
Kumar

(10) Patent No.: US 9,715,422 B2
(45) Date of Patent: Jul. 25, 2017

(54) METHOD AND SYSTEM FOR DETECTING ROOT CAUSE FOR SOFTWARE FAILURE AND HARDWARE FAILURE

(71) Applicant: Wipro Limited, Bangalore (IN)

(72) Inventor: Pulluru Shravan Kumar, Telangana (IN)

(73) Assignee: WIPRO LIMITED, Bangalore (IN)

( * ) Notice: Subject to any disclaimer, the term of this patent is extended or adjusted under 35 U.S.C. 154(b) by 127 days.

(21) Appl. No.: 14/883,664

(22) Filed: Oct. 15, 2015

(65) Prior Publication Data

US 2017/0060658 A1   Mar. 2, 2017

(30) Foreign Application Priority Data

Aug. 27, 2015  (IN) ............................ 4519/CHE/2015

(51) Int. Cl.
G06F 11/00 (2006.01)
G06F 11/07 (2006.01)
G06F 11/36 (2006.01)

(52) U.S. Cl.
CPC ........ *G06F 11/079* (2013.01); *G06F 11/0751* (2013.01); *G06F 11/0787* (2013.01); *G06F 11/362* (2013.01); *G06F 11/3636* (2013.01)

(58) Field of Classification Search
CPC .... G06F 11/079; G06F 11/22; G06F 11/3636; G06F 11/364; G06F 11/3648; G06F 11/366; G06F 11/3664; G06F 11/3696
See application file for complete search history.

(56) References Cited

U.S. PATENT DOCUMENTS 5,287,505 A * 2/1994 Calvert ............... G06F 11/0748
5,704,034 A * 12/1997 Circello ............. G06F 11/3648
714/34

(Continued)

FOREIGN PATENT DOCUMENTS

CN  101539766  9/2009
FR  2 793 328   11/2000

OTHER PUBLICATIONS

European Search Report issued Aug. 17, 2016 in European Patent Office in counterpart European Patent No. Application 16153515. 9 pages.

*Primary Examiner* — Gabriel Chu
(74) *Attorney, Agent, or Firm* — Finnegan, Henderson, Farabow, Garrett & Dunner, LLP

(57) ABSTRACT

The present disclosure relates to a method and system for detecting root cause for software failure and hardware failure. The system comprises a debugging unit with one or more preconfigured communication protocols. The debugging unit identifies one or more debugging issues and performs protocol level transactions with the hardware, participating in the system integration, through a suitable communication protocol. The debugging unit also determines status of the protocol level data transaction based on whether a data read failure has occurred during this transaction. The status is unsuccessful when there is a data read failure in the data transaction and the status is successful otherwise. The root cause for the failure is detected to be one of the hardware components when the status is unsuccessful and the software application when the status is successful. Finally, the detected root causes are resolved using appropriate techniques.

18 Claims, 5 Drawing Sheets

(56) References Cited

U.S. PATENT DOCUMENTS

| | | | |
|---|---|---|---|
| 6,567,935 B1* | 5/2003 | Figueroa | G06F 11/0775 714/37 |
| 2002/0184576 A1* | 12/2002 | Arndt | G06F 11/0712 714/48 |
| 2004/0260595 A1* | 12/2004 | Chessell | G06F 11/0748 714/47.2 |
| 2005/0183066 A1* | 8/2005 | Jabori | G06F 11/3636 717/124 |
| 2009/0183030 A1* | 7/2009 | Bethke | G06F 11/0709 714/37 |
| 2013/0031533 A1* | 1/2013 | Machida | G06F 11/3692 717/127 |
| 2013/0061096 A1* | 3/2013 | McCoy | G06F 11/079 714/45 |
| 2014/0258790 A1* | 9/2014 | Sorenson | G06F 11/006 714/48 |
| 2014/0281722 A1 | 9/2014 | Kraipak et al. | |
| 2015/0347923 A1* | 12/2015 | Bartley | G06F 11/079 706/12 |
| 2016/0147587 A1* | 5/2016 | An | G06F 11/3644 714/37 |

* cited by examiner

METHOD AND SYSTEM FOR DETECTING ROOT CAUSE FOR SOFTWARE FAILURE AND HARDWARE FAILURE

PRIORITY CLAIM

This U.S. patent application claims priority under 35 U.S.C. §119 to India Application No. 4519/CHE/2015, filed Aug. 27, 2015. The entire contents of the aforementioned application are incorporated herein by reference.

TECHNICAL FIELD

The present subject matter is related, in general to debugging of a system, and more particularly, but not exclusively to a method and system for detecting root cause for software failure and hardware failure during system integration.

BACKGROUND

The electronic industry has reached a point at which the dependencies between software and hardware have become so significant that they must be designed, integrated and debugged together. Efficient debug at the hardware/software interface requires complete understanding of various things, such as what is happening in the processor, the device registers, memory maps, bus accesses that connect the processor to the peripherals, operating system being used, and device drivers. This kind of debugging capability has become crucial for delivering products successfully, at the right time, and at appropriate cost points.

The issue with debugging of the system where hardware and software are integrated and software expects some data from the hardware via some form of communication involves hand-shaking mechanism for the data transaction. If there is any failure in the data transaction, then the debugger has to identify the root cause of this problem which could be either in the software or in the hardware and provide a respective solution.

In one conventional approach, the debugging of the software may be carried out first. In case there is no problem with the software, then the debugging of the hardware is carried out to identify the problem as hardware and thereafter the problem is fixed. Such conventional approach involves lot of resources, time and investment for debugging the system.

Debugging the hardware/software becomes a necessity for delivering quality systems and meeting production goals. So it is desirable to identify the underlying problem as software or hardware before debugging so that the resource can concentrate on the exact issue without being deviated.

The issue mainly faced in detecting root cause for hardware failure and software failure is performing protocol level transactions between the one or more components in a system such that the exact issue is identified before performing the debugging process.

SUMMARY

Disclosed herein is a system and method of detecting a root cause for one of software or a hardware failure during system integration. The system comprises a debugging unit with one or more preconfigured communication protocols. The debugging unit identifies one or more debugging issues and performs protocol level transactions with the hardware participating in the system integration, through a suitable communication protocol. The data obtained from the transaction is parsed and presented to the users by means of a Graphical User Interface or a Command-line Interface based application.

Accordingly, the present disclosure relates to a method of detecting a root cause for one of a software failure and a hardware failure during system integration. The method comprises identifying, by a debugging unit, one or more debugging issues associated with at least one of the software and hardware participating in the system integration. Upon identifying the debugging issues, the debugging unit receives application data from the hardware through at least one of one or more communication protocols, wherein the application data is the data expected by the software to run an application. Thereafter, the debugging unit obtains transactional data generated while receiving the application data through the at least one of the one or more communication protocols and finally detects the root cause for one of the software failure and the hardware failure by analyzing the application data and the transactional data.

Further, the present disclosure relates to a debugging system for detecting a root cause for software failure and hardware failure during integration of a system wherein the debugging system comprises a processor and a debugging unit communicatively coupled to the processor. The debugging system also has a memory unit communicatively coupled to the debugging unit, wherein the memory stores instructions, which, on execution, causes the debugging unit to identify one or more debugging issues associated with at least one of software and hardware participating in the system integration. Upon identification of one or more debugging issues, the debugging unit receives application data from the hardware through at least one of one or more communication protocols, wherein the application data is the data expected by the software to run an application. Further, the instructions cause the debugging unit to obtain transactional data generated while receiving the application data through the at least one of the one or more communication protocols and to detect the root cause for one of the software failure and the hardware failure by analyzing the application data and the transactional data.

Furthermore, the present disclosure relates to a non-transitory computer readable medium including instructions stored thereon that when processed by a debugging unit associated with a processor in a debugging system, performs operations comprising identifying one or more debugging issues associated with at least one of software and hardware participating in the system integration. Upon identifying the one or more debugging issues, the instructions cause the debugging unit to receive application data from the hardware via at least one of one or more communication protocols, wherein the application data is the data expected by the software to run an application. After receiving the application data, the debugging unit obtains transactional data generated while receiving the application data through at least one of the one or more communication protocols and detects the root cause for one of the software failure and the hardware failure by analyzing the application data and the transactional data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 3:
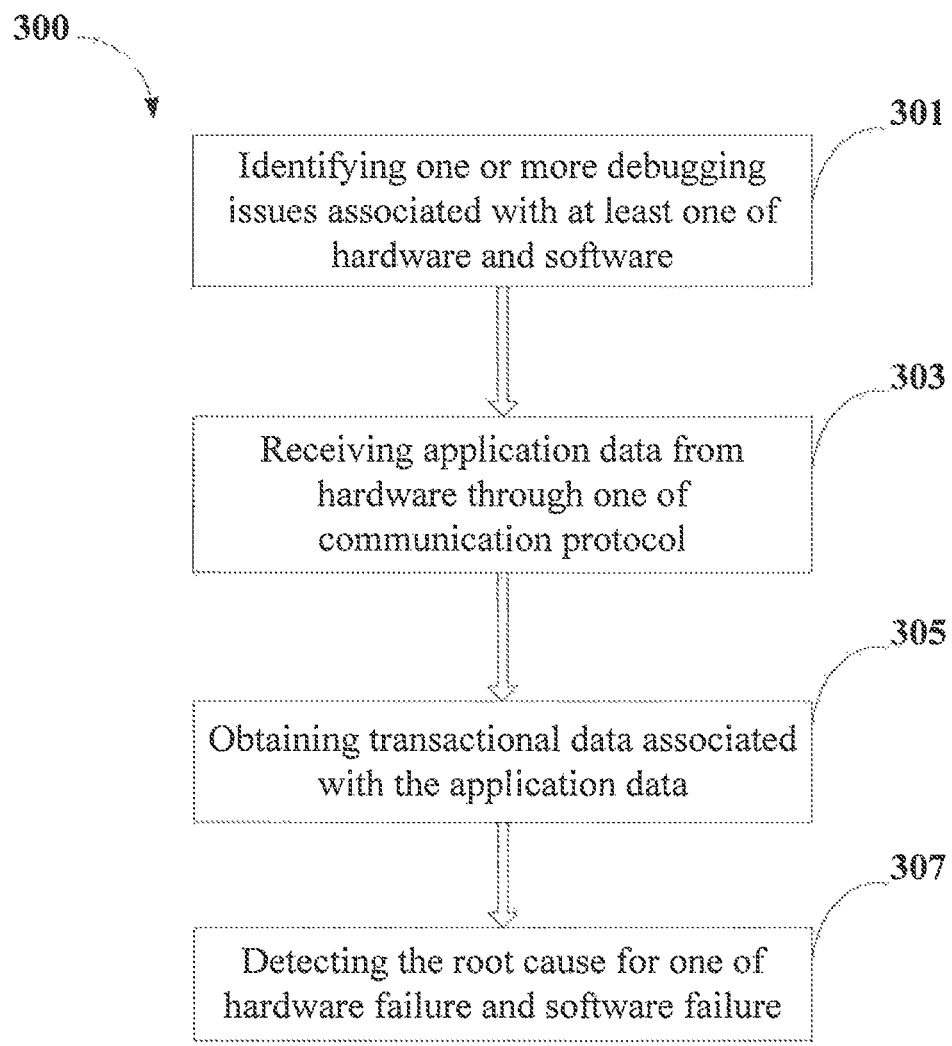
Figure 4:
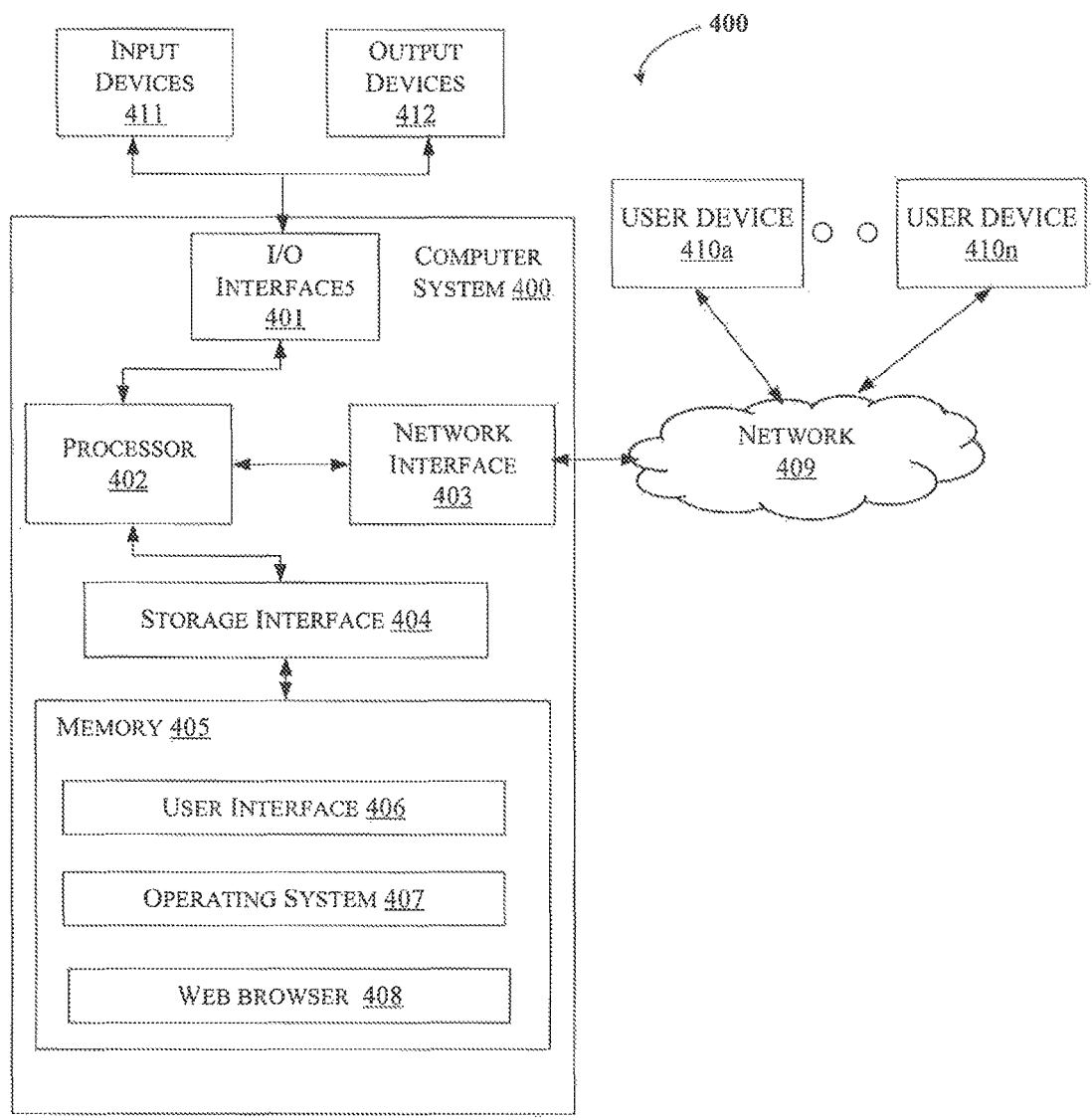

FIG. 3 shows a flowchart illustrating a method of detecting a root cause for software failure and hardware failure during system integration in accordance with some embodiments of the present disclosure; and FIG. 4 illustrates a block diagram of an exemplary computing system for implementing embodiments consistent with the present disclosure, It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . " does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1A:
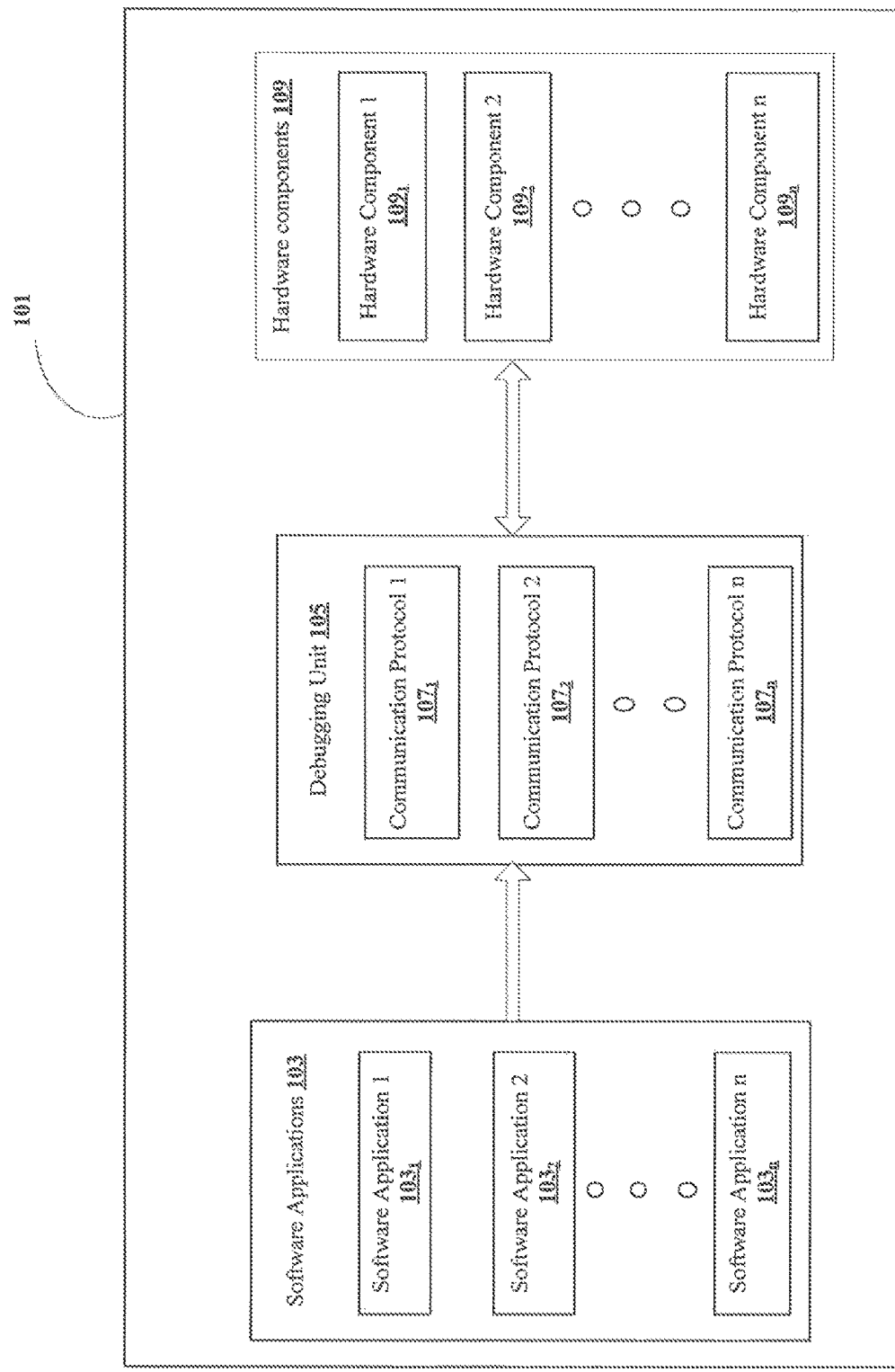
FIG. 1a shows an exemplary block diagram illustrating a system in accordance with some embodiments of the present disclosure.

FIG. 1a shows a block diagram illustrating a system 101 in accordance with some embodiments of the present disclosure.

The system 101 comprises of one or more software applications, software application 1 $103_1$ to software application n 103n (collectively referred as software applications 103), a debugging unit 105 and one or more hardware components, hardware component 1 $109_1$ to hardware component n 109, (collectively referred as hardware components 109). The debugging unit 105 comprises one or more communication protocols, communication protocol 1 $107_1$ to communication protocol n $107_n$ (collectively referred as communication protocols 107) which are preconfigured in the debugging unit 105. As an example, the one or more applications 103, may include, but are not limited to, touch-based applications, camera-based applications, sensor-based applications, an email application, an audio/video application, a gaming application or a calculator application of the computing system 101. The debugging unit 105 consists of drivers involving one or more communication protocols 107. The one or more communication protocols 107, may include, but are not limited to, Inter Integrated Circuit (I2C), Serial Peripheral Interface (SPI), Universal Asynchronous Transmitter Receiver (UART), Universal Serial Bus (USB), Wide Area Network (WAN), Local Area Network (LAN) and Wireless Wide Area Network (WWAN). A person skilled in the art may note that any other communication protocol may be used for the purpose of the present disclosure. The hardware components 109 are the physical parts or components of the computing system 101, such as the monitor, mouse, keyboard, computer data storage, hard disk drive (HDD), graphic cards, sound cards, sensor hub camera device, and motherboard etc.

In an embodiment, one or more debugging issues may arise during integration of the system 101 running with operating system, device drivers and applications. The debugging issues may also be due to defect in the functions of the system. The debugging unit 105 identifies the one or more debugging issues associated with at least one of the software applications 103 and hardware components 109 participating in the system 101 integration. In an embodiment, the debugging unit 105 receives application data from the hardware components 109 through at least one of the one or more communication protocols 107. The application data is the data expected by the software application 103 to run/execute the application successfully. The debugging unit 105 also generates transactional data while receiving the application data through at least one of the one or more communication protocols 107. The transactional data comprises information associated with a memory location selected based on a user input, one or more operations to be performed for the data retrieved and mapping of one or more operations to the retrieved data. On completion of the transaction of the data between the debugging unit 105 and the one or more hardware components 109, the status of the data transaction between the hardware component 109 and the debugging unit 106 is detected by analysing both of the application data and the transactional data. The status is unsuccessful when there has been a data read failure during the data transaction and the status is successful when there is no data read failure during the data transaction. Data read failure occurs when the receiving component in a communication channel fails to get the required data. Finally, the debugging unit 105 detects the root cause for the raised debugging issue based on the obtained status. The root cause is detected to be one of the hardware components 109 when the status is unsuccessful and root cause is detected to be the software application 103 when the status is successful. Also, the detected root cause is debugged to resolve the issues associated with either the software or the hardware components 109 in the system 101.

Consider as an example, the system 101 to be a tablet phone and the issue may be that "High Definition Multimedia Interface (HDMI) is not detected" even when the HDMI is connected to the tablet phone. In this scenario, the debugging unit 105 identifies the debugging issue and receives the application data from the HDMI through a communication channel using one of the one or more preconfigured communication protocols 107. As an example, the communication protocol 107 being used is an Inter Integrated Circuit (I2C). In said example, if the transactional data is not received, the debugging unit 105 may identify it as a hardware defect. In case, the transactional data is received, the debugging unit may identify it as a software defect. The transaction data may be understood as the data generated through the I2C protocol while communicating the application data. The root cause for the raised issue is then detected to be one of display module or the HDMI associated with the tablet phone based on the determined status.

Figure 1B:
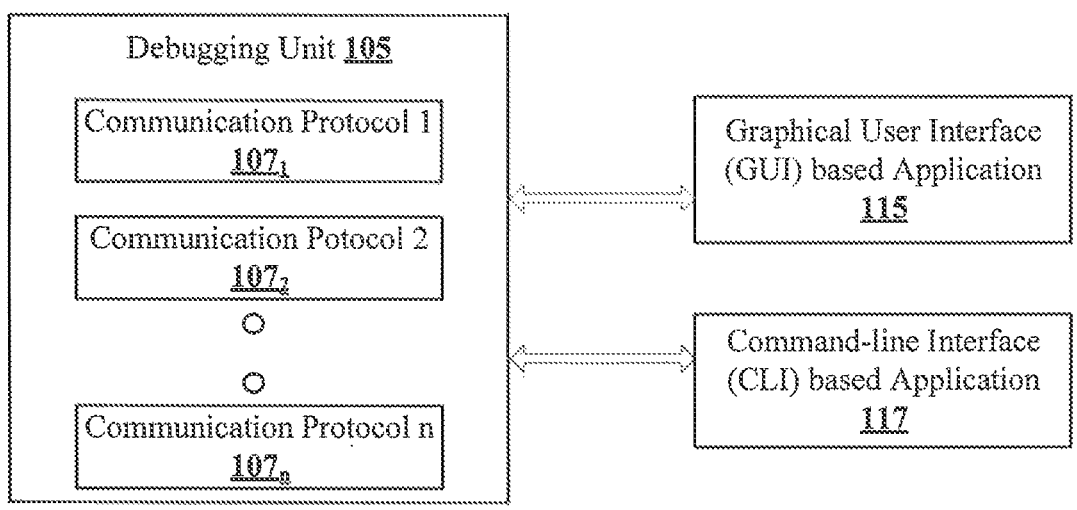
FIG. 1b shows an exemplary block diagram illustrating a debugging unit in accordance with some embodiments of the present disclosure.

FIG. 1b shows a block diagram illustrating a debugging unit 102 in accordance with some embodiments of the present disclosure.

The debugging system 102 comprises one or more communication protocols 107 and is associated with one of a Graphical User Interface (GUI) 115 and Command-line Interface (CLI) 117 applications. The debugging unit 105 is communicatively coupled to processor and memory of the system 101. The memory associated with the system 101 stores the one or more instructions, which on execution causes the processor on the system 101 to perform one or more data operations through the selected communication protocol 107.

The GUI based application 115 and the CU based application 117 facilitates the interface for the users to provide one or more inputs to control the data operations performed by the debugging unit 105. The one or more user inputs may include, but are not limited to selecting a memory location, selecting a memory register and to select a communication protocol to perform the one or more data operations between the hardware components 109 and the debugging unit 105. The data operations performed can be one of reading from the selected memory or writing into the selected memory. Further, in some scenarios, the data obtained from the performed operations may need to be mapped to user readable data and in other scenarios it may be presented directly. The interfaces are also used for providing notifications, from the debugging unit 105, indicating the root cause for the failure associated with the system 101.

Figure 2:
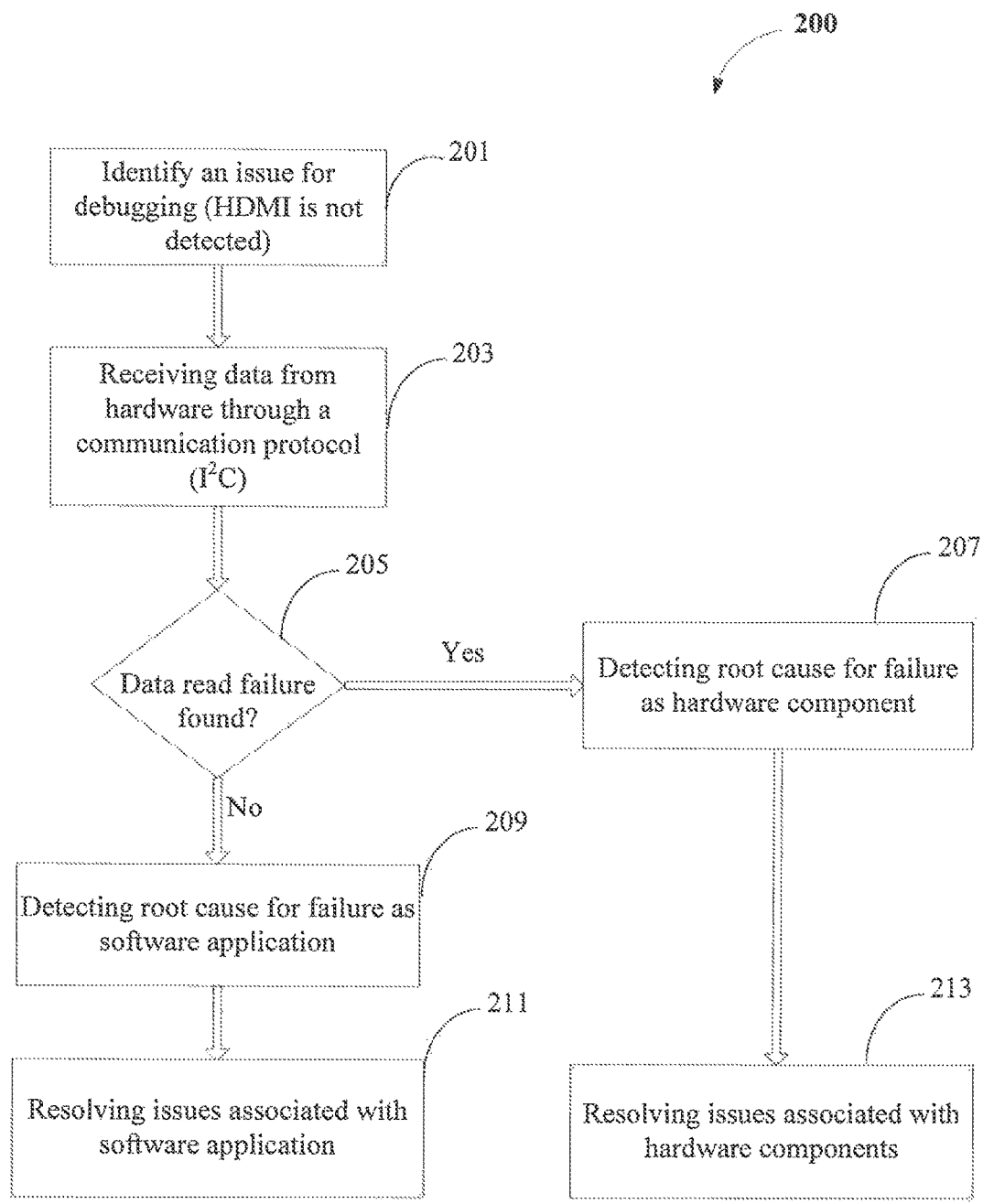
FIG. 2 shows a flowchart illustrating an exemplary method for detecting the root cause for one of a software failure and a hardware failure in accordance with some embodiments of the present disclosure.

FIG. 2 illustrates a flowchart 200 showing an exemplary method for detecting one or more debugging issues in accordance with some embodiments of the present disclosure.

In an exemplary embodiment consider the system 101 as a tablet phone or a tablet computer, referred to as tablet hereinafter, which has one or more debugging issues due to failure of one or more associated software applications 103 or the hardware components 109. The most common debugging issues associated with a tablet may include, but are not limited to, problems in connecting to Wi-Fi or Internet, document print errors, touchscreen insensitivity and the tablet not detecting the connected peripheral devices.

At block 201, the debugging unit 105 receives one of the one or more debugging issues of the tablet, As an example, one of the issues picked up by the debugging unit 105 could be that High Definition Multimedia Interface (HDMI) is not detected on the tablet due to Extended Display Identification Data (EDID) read failure. EDID is a data structure provided by a digital display to describe its capabilities to a video source (e.g. graphics card or set-top box). This enables a modern personal computer to know what kind of monitors is connected to it. In order to determine the root cause for the EDID read failure, the data expected by the software application 103 i.e. EDID is passed to the debugging unit 105 from the corresponding hardware component HDMI through a communication protocol 107.

At block 203 the debugging unit 105 selects an appropriate communication protocol 107, among the one or more preconfigured communication protocols 107. The communication protocols 107 may include, but are not limited to, I2C, SPI, UART USB and any other network protocols like LAN, WAN, WWAN and Wi-Fi. As an example, 120 is used as the channel for transmitting the EDID from the display to the graphics card in the video source.

At block 205, the debugging unit 105 determines whether there exists a data read failure during the data transaction between the participating hardware component 109 and the debugging unit 105. Data read failure occurs when the receiving component in a communication channel fails to get the required data.

The debugging unit 105 proceeds to block 207 when the status of data transmission is unsuccessful, that is, when the data read failure has occurred. Else, the debugging unit 105 proceeds to block 209 when the status of data transmission is successful, that is, when there is no data read failure.

In an example, the command "read data 0x12345678" via I2C causes the debugging unit 105 to look into the address location 0x12345678 and to perform a read operation from the address location "using I2C". If the data is read successfully from the address location 0x12345678, the debugging unit 105 detects the root cause to be the software failure as shown in block 209. Further, the debugging unit 105 provides a notification to the user, notifying the detected root cause, on at least one of the GUI based application 115 or the CLI based application 117. As an example, the displayed notification in case of the software failure may be a message saying "Able to get data from the Hardware. Hence it is Software issue".

At block 211, the debugging unit 105 resolves the issues associated with the software application 103 when the detected root cause is the software application 103.

Alternatively, if the data is not read successfully from the address location ox12345678 the debugging unit 105 detects the root cause to be the hardware failure as shown in block 207. Further, the debugging unit 105 displays a notification, notifying the detected root cause, on at least one of the GUI based application 115 or the CLI based application 117. As an example, the displayed notification may comprise a message saying "Not able to get data from the Hardware. Hence it is Hardware Issue".

At block 213, the debugging unit 105 resolves the issues associated with the one or more hardware components 109 when the detected root cause is one of the hardware components 109. As an example, the user might check for the cable connectivity, power supply and other external components associated with the system 101.

FIG. 3 illustrates a flowchart 300 showing a method for detecting root cause for software failure and hardware failure during system integration in accordance with some embodiments of the present disclosure.

As illustrated in FIG. 3, the method 300 comprises one or more blocks for detecting root cause for one of software failure or a hardware failure during system integration using a debugging unit 105. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software firmware or combination thereof.

At block 301, the debugging unit 105 identifies one or more issues associated with at least one of the software and hardware participating in the system 101 integration. As an example, the issue may arise in a system 101 during system integration where hardware and software 103 are integrated and the software expects some data from the hardware 109 via communication protocols 107 which involves some data transaction.

At block 303, the debugging unit 105 receives, the application data, from one of the one or more hardware components 109 of the system 101. The application data is the data expected by the software application 103. One or more operations are performed through corresponding one of the one or more preconfigured communication protocols 107 configured in the debugging unit 105. As an example, the preconfigured communication protocols 107 may include, but are not limited to, I2C, SPI, UART USB, network based protocols like LAN, WAN, WWAN or Wi-Fi and any upcoming new technology.

At block 305, debugging unit 105 obtains the transactional data generated while receiving the application data through the at least one of the one or more communication protocols 107. The transactional data may comprise a memory location selected based on a user input, one or more operations to be performed for data retrieved, and mapping of operations to data. The user may provide one or more commands to the debugging unit 105 through one of the GUI based application 115 or Command-line application 117 to perform one or more operations on one of the hardware components 109.

At block 307, the debugging unit 105 detects the root cause for the one of the software application 103 and the hardware component 109 by determining status of the data transaction between one of the hardware components 109 and the debugging unit 105. The status is unsuccessful when there has been a data read failure in the data transaction and the status is successful when there is no data read failure in the data transaction. Data read failure occurs when the receiving component in a communication channel fails to get the required data. If the status is unsuccessful, then the debugging unit 105 detects that the root cause is the hardware failure and if the status is successful then the debugging unit 105 detects that the root cause is software failure.

Also, the debugging unit 105 resolves the debugging issues identified in the one of the one or more hardware components 109 or the software application 103 participating in the system integration.

Computer System

FIG. 4 illustrates a block diagram of an exemplary computer system 400 for implementing embodiments consistent with the present invention. In an embodiment, the computer system 400 is used to detect a root cause for one of a software failure and a hardware failure during system integration by using a debugging unit 105. The computer system 400 may comprise a central processing unit ("CPU" or "processor") 402. The processor 402 may comprise at least one data processor for executing program components for executing user- or system generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more user devices 410 (a, . . . ,n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more user devices 410 (a, . . . ,n) may include, without limitation, personal computer(s), mobile devices such as cellular telephones, smartphones, tablet computers, eBook readers, laptop computers, notebooks, gaming consoles, or the like.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID) solid-state memory devices, solid-state drives, etc.

The memory 405 may store a collection of program or database components, including, without limitation, user interface application 406, an operating system 407, web server 408 etc. In some embodiments, computer system 400 may store user/application data 406, such as the data, variables, records, etc. as described in this invention. Such databases may be implemented as fault-tolerant, relational scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8/10, etc.), Apple iOS, Google Android, Blackberry Operating System (OS), or the like, User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc,), Unix X-Windows, web interface libraries (e.g., ActiveX, Java, Javascript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc, Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives Compact Disc (CD) ROMs, Digital Video Disc (DVDs), flash drives, disks, and any other known physical storage media.

Advantages of the Embodiment of the Present Disclosure are Illustrated Herein.

In an embodiment, the present disclosure provides a method of detecting a root cause for one of a software failure and a hardware failure during system integration.

In an embodiment, the present disclosure provides a method to improve the overall productivity of a system during integration by reducing time taken for debugging.

In an embodiment, the present disclosure provides a method to perform protocol level verification of the transactions between the hardware components, software components and the debugging unit.

In an embodiment, the present disclosure is extendible to use one or more upcoming communication protocols for performing one or more transactions at the protocol level.

In an embodiment, the present disclosure can be ported easily across platforms running with OS, Device Drivers, BIOS and Firmware.

In an embodiment, the present disclosure provides a method to validate the Best Known Configuration (BKC) for a given set of Operating System, Device Drivers and Firmware.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the listed claims below.

REFERRAL NUMERALS

| Reference Number | Description |
|---|---|
| 101 | System |
| 103 | Software Applications |
| 105 | Debugging Unit |
| 107 | Communication Protocols |
| 109 | Hardware components |
| 115 | Graphical User Interface (GUI) based application |
| 117 | Command-line Interface (CLI) based application |

I claim:

1. A method of detecting a root cause for one of a software failure and a hardware failure during system integration, the method comprising:
   identifying, by a debugging unit, one or more debugging issues associated with at least one of the software and hardware participating in the system integration;
   receiving, by the debugging unit, application data from the hardware through at least one of one or more communication protocols, wherein the application data is data expected by the software to run an application;
   obtaining, by the debugging unit, transactional data generated while receiving the application data through at least one of the one or more communication protocols; and
   detecting, by the debugging unit, the root cause for one of the software failure and the hardware failure by analyzing the application data and the transactional data.

2. The method as claimed in claim 1, wherein the one or more communication protocol comprises at least one of Inter-Integrated Circuit (I2C), Serial Peripheral Interface (SPI), Universal Asynchronous Receiver Transmitter (UART), Universal Serial Bus (USB), Local Area Network (LAN), Wide Area Network (WAN), and Wireless Wide Area Network (WWAN).

3. The method as claimed in claim 1, wherein the application data comprises stored data retrieved from a memory location selected based on a user input.

4. The method as claimed in claim 1 wherein the transactional data comprises a memory location selected based on a user input, operations to be performed for data retrieved, and mapping of operations to data.

5. The method as claimed in claim 1, wherein detecting the root cause further comprises:
   detecting the root cause in the hardware for causing the hardware failure upon identifying a data read failure in at least one of the application data and the transaction data;
   providing a notification, to a user, on at least one of a Graphical User Interface (GUI) and a Command Line Interface (CLI) to indicate the root cause for the hardware failure; and
   debugging the root cause to resolve the one or more debugging issues associated with the hardware.

6. The method as claimed in claim 1, wherein detecting the root cause further comprises:
   detecting the root cause in the software for causing the software failure upon identifying a successful data read operation of the application data through at least one of the one or more communication protocols;
   providing a notification, to a user, on at least one of a Graphical User Interface (GUI) and a Command Line Interface (CLI) to indicate the root cause for the software failure; and
   debugging the root cause to resolve he one or more debugging issues associated with the software failure.

7. A debugging system for detecting a root cause for one of a software failure and a hardware failure during integration of a system, the debugging system comprising:
   a processor;
   a debugging unit communicatively coupled to the processor; and
   a memory communicatively coupled to the debugging unit, wherein the memory stores instructions, which, on execution, causes the debugging unit to:
      identify one or more debugging issues associated with at least one of software and hardware participating in the system integration;
      receive application data from the hardware via at least one communication protocol, wherein the application data is data expected by the software to run an application;
      obtain transactional data generated while receiving the application data through the at least one communication protocol; and
      detect the root cause for one of the software failure and the hardware failure by analyzing the application data and the transactional data.

8. The system as claimed in claim 7, wherein the at least one communication protocol comprises Inter-Integrated Circuit (I2C), Serial Peripheral Interface (SPI), Universal Asynchronous Receiver Transmitter (UART), Universal Serial Bus (USB), Local Area Network (LAN), Wide Area Network (WAN), and Wireless Wide Area Network (WWAN).

9. The system as claimed in claim 7, wherein the application data comprises stored data retrieved from a memory location selected based on a user input.

10. The system as claimed in claim 7, wherein the transaction data comprises a memory location selected based on a user input, operations to be performed for data retrieved, and mapping of operations to data.

11. The system as claimed in claim 7, wherein the debugging unit further detects the root cause by performing one or more operations comprising:

detecting the root cause in the hardware for causing the hardware failure upon identifying a data read failure in at least one of the application data and the transaction data;

providing a notification, to a user, on at least one of a Graphical User Interface (GUI) and a Command Line Interface (CLI) to indicate the root cause for the hardware failure: and debugging the root cause to resolve the one or more debugging issues associated with hardware.

12. The system as claimed in claim 7, wherein the debugging unit further detects the root cause by performing one or more operations comprising:

detecting the root cause in the software for causing the software failure upon identifying a successful data read operation of the application data via the at least one communication protocol;

proving a notification, to a user, on at least one of a Graphical User Interface (GUI) and a Command Line Interface (CLI) to indicate the root cause for the software failure; and debugging the root cause to resolve the one or more debugging issues associated with software.

13. A non-transitory computer readable medium including instructions stored thereon that when processed by a debugging unit, associated with a processor in a debugging system, performs operations comprising:

identifying one or more debugging issues associated with at least one of software and hardware participating in the system integration;

receiving application data from the hardware via at least one communication protocol, wherein the application data is data expected by the software to run an application;

obtaining transactional data generated while receiving the application data through the at least one communication protocol; and detecting the root cause for one of the software failure and the hardware failure by analyzing the application data and the transactional data.

14. The medium as claimed in claim 13, wherein the at least one communication protocol comprises Inter-Integrated Circuit (I2C), Serial Peripheral Interface (SPI), Universal Asynchronous Receiver Transmitter (UART), Universal Serial Bus (USB), Local Area Network (LAN), Wide Area Network (WAN), and Wireless Wide Area Network (WWAN).

15. The medium as claimed in claim 13, wherein the application data comprises stored data retrieved from a memory location selected based on a user input.

16. The medium as claimed in claim 13, wherein the transaction data comprises a memory location selected based on a user input, operations to be performed for data retrieved, and mapping of operations to data.

17. The medium as claimed in claim 13, wherein the instructions causes the debugging unit to detect the root cause by performing one or more operations comprising:

detecting the root cause in the hardware for causing the hardware failure upon identifying a data read failure in at least one of the application data and the transaction data;

providing a notification, to a user, on at least one of a Graphical User Interface (GUI) and a Command Line Interface (CLI) to indicate the root cause for the hardware failure; and debugging the root cause to resolve the one or more debugging issues associated with hardware.

18. The medium as claimed in claim 13, wherein the instructions causes the debugging unit to detect the root cause by performing one or more operations comprising:

detecting the root cause in the software for causing the software failure upon identifying a successful data read operation of the application data via the at least one communication protocol;

proving a notification, to a user, on at least one of a Graphical User Interface (GUI) and a Command Line Interface (CLI) to indicate the root cause for the software failure; and debugging the root cause to resolve the one or more debugging issues associated with software.

* * * * *